United States Patent [19]

Nakanishi

[11] Patent Number: 5,018,038

[45] Date of Patent: May 21, 1991

[54] THIN FILM MAGNETIC HEAD WITH LAMINATED METAL AND NON MAGNETIC FILM

[75] Inventor: Kanji Nakanishi, Kanagawa, Japan

[73] Assignee: Fuji Photo Film Co., Ltd., Kanagawa, Japan

[21] Appl. No.: 413,504

[22] Filed: Sep. 27, 1989

[30] Foreign Application Priority Data

Oct. 4, 1988 [JP] Japan ................................ 63-249059

[51] Int. Cl.$^5$ ............................................. G11B 5/147
[52] U.S. Cl. ..................................... 360/126; 360/125
[58] Field of Search ........................ 360/127, 125–126, 360/119–122

[56] References Cited

U.S. PATENT DOCUMENTS

| 4,669,015 | 5/1987 | Ruigrok | 360/119 |
| 4,780,779 | 10/1988 | Pisharody | 360/120 |
| 4,868,698 | 9/1989 | Takahashi et al. | 360/126 |

FOREIGN PATENT DOCUMENTS 1-122010  5/1989  Japan .

OTHER PUBLICATIONS

Technical Research Report, Soc. of Electronics Communication, on Magnetic Recording MR84-28 (1984), 7, entitled, "Narrow Track Single Pole Head for Perpendicular Magnetic Recording", by K. Nakanishi.

Primary Examiner—John H. Wolff
Attorney, Agent, or Firm—Sughrue, Mion, Zinn, Macpeak & Seas

[57] ABSTRACT

A thin film magnetic head adapted for recording and/or reproducing signals at a frequency of 1 MHz or higher, in which a soft magnetic film having uniaxial magnetic anisotropy is used as a magnetic pole film material and the direction of the magnetic path of the magnetic circuit of the head is arranged to be substantially orthogonal to the axis of easy magnetization, wherein a magnetic pole film constituting the magnetic path is formed as a lamination of at least two, particularly four soft magnetic films, with an intervening nonmagnetic film between the adjacent soft magnetic films, the length W of the magnetic pole film along the direction of the axis of easy magnetization is 30 $\mu m \leq W \leq 300$ $\mu m$, and the uniaxial magnetic anisotropy constant Ku is Ku$\leq$300 J/m$^3$. This provides a relative permeance of at least 1000.

18 Claims, 4 Drawing Sheets

THIN FILM MAGNETIC HEAD WITH LAMINATED METAL AND NON MAGNETIC FILM

FIELD OF THE INVENTION

This invention relates to a thin layer magnetic head whereby a high reproducing output suitable for high density magnetic recording may be obtained in the region of the high frequency.

BACKGROUND

The term "high frequency" used in the present application generally refers to 1 MHz or higher frequencies. The thin film magnetic head is one employed most advantageously with a magnetic disk or a magnetic tape in cases where the magnetic recording density and the working frequency of the magnetic recording medium are extremely high. An induction type thin layer magnetic head, which relies upon electro-magnetic induction, is comprised of a lower magnetic pole film and an upper magnetic pole film making up a magnetic circuit having a magnetic gap, a coil conductor film interlinked with this magnetic circuit, and an insulation film, adapted for electrically and magnetically insulating magnetic coils from one another or from the magnetic poles, these various films being formed by thin film forming and precision processing techniques and laminated one upon the other to form a thin magnetic film.

Such induction type thin film magnetic head usually employs fine-structured magnetic cores (microcores) formed by thin films of soft magnetic metal, and hence is subject to lesser core losses at high frequencies, such as eddy current losses, than the bulk type magnetic head. In addition, the magnetic circuit may be compact in size. Thus, with the use of the induction type thin film magnetic head, recording and reproducing efficiencies may be improved in magnetic recording and reproduction over a broader range of frequencies. The induction type thin film magnetic head is also essentially suitable for use in high frequency high density magnetic recording since it may be formed by a microcore and coil winding (microcoil) and hence may be of lower impedance.

The electro-magnetic conversion characteristics of such thin film magnetic head greatly depend on the magnetic properties of the magnetic pole films. That is, for achieving sufficient recording on a high coercivity magnetic medium which enables recording at shorter wavelengths, the magnetic pole films having a high saturation flux density are required. On the other hand, for achieving faithful and efficient recording and/or reproduction of high frequency signals, high magnetic permeability in the high frequency range is required.

Generally for achieving high magnetic permeability, it is necessary to adopt rotation of magnetization with a high switching speed, rather than the magnetic wall movement, as the magnetization process. To this end, it is necessary for the magnetic pole films to be provided with uniaxial magnetic anisotropy so that the direction of the track width of the thin film magnetic head represents the axis of easy magnetization, and for the axis of difficult magnetization to coincide with the direction of magnetic excitation.

PROBLEM TO BE SOLVED

The magnetic permeability of a magnetic pole film is lowered with too high a uniaxial magnetic anisotropy characteristic of its magnetic material, since then the gradient of the magnetization curve in the direction of the axis of difficult magnetization diminishes. On the other hand, with too low a uniaxial magnetic anisotropy, the effective magnetic permeability in the high frequency range is lowered since the magnetic wall tends to be moved more easily. Thus there should exist an optimum value of uniaxial magnetic anisotropy. However, the optimum condition for the thin film magnetic head cannot be determined in a simple manner since it depends not only on uniaxial magnetic anisotropy but also on the configuration of the magnetic core of the magnetic head.

SUMMARY OF THE DISCLOSURE

It is therefore a principal object of the present invention to provide a thin film magnetic head having an improved magnetic permeability in the high frequency range of the magnetic core and an excellent recording and/or reproducing efficiency, by providing an optimum condition.

According to the present invention the aforesaid object is achieved by providing a thin film magnetic head adapted for recording and/or reproducing signals at a frequency of 1 MHz or higher, in which a soft magnetic metal film having uniaxial magnetic anisotropy is used as a magnetic pole film material and the direction of the magnetic path of the magnetic circuit of the head is arranged to be substantially orthogonal to the axis of easy magnetization, wherein the improvement resides in:

that a magnetic pole film constituting the magnetic path is formed as a lamination of two or more soft magnetic metal films, with an intervening nonmagnetic film between the adjacent soft magnetic metal films, that the length W of the magnetic pole film along the direction of the axis of easy magnetization is such that 30 $\mu m \leq W \leq 300$ $\mu m$, and that the uniaxial magnetic anisotropy constant Ku is such that $Ku \leq 300$ J/m$^3$.

Thus, according to the present invention, an optimum value of the uniaxial magnetic anisotropy can be found and selected corresponding to any configuration of a particular magnetic core for providing a thin film magnetic head having a satisfactory recording and/or reproducing efficiency in the region of high frequencies.

The thickness of the nonmagnetic film is preferably 0.002 to 0.1 $\mu m$ and more preferably 0.002 to 0.05 $\mu m$.

The above described thin film magnetic head has a satisfactory recording and/or reproducing efficiency in that the magnetic permeability can be improved in the high frequency range of the magnetic core.

According to the present invention, by selecting the laminated thin film structure, the magnetic pole width and the uniaxial magnetic anisotropy constant so as to meet the requirement of the present invention, the recording and/or reproducing efficiency may be improved for signals having the high frequencies of 1 MHz or more.

BRIEF DESCRIPTION OF THE DRAWINGS

FIG. 1 illustrates the relation between the magnetic pole width and the constant of uniaxial magnetic anisotropy subject to providing a same value of relative magnetic permeability, wherein (a), (b), (c), (d), (e) and (f) illustrate such relation for:

(a) a single layer film at a frequency of 10 MHz, (b) a single layer film at a frequency of 1 MHz,
(c) a double layer film at a frequency of 10 MHz,
(d) a double layer film at a frequency of 1 MHz,
(e) a four-layer film at a frequency of 10 MHz, and
(f) a four-layer film at a frequency of 1 MHz.

Figure 2:
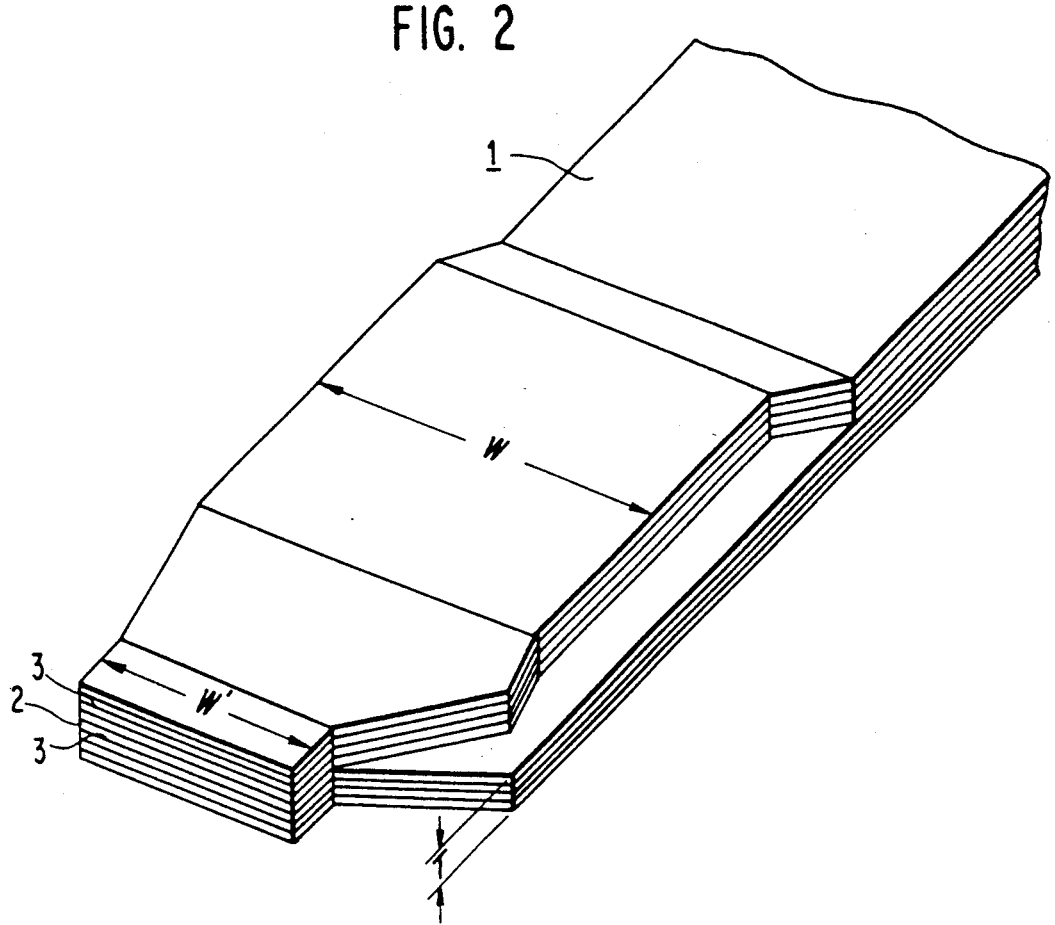

FIG. 2 shows the configuration of a magnetic core of a thin film magnetic head according to an embodiment of the present invention.

Figure 3:
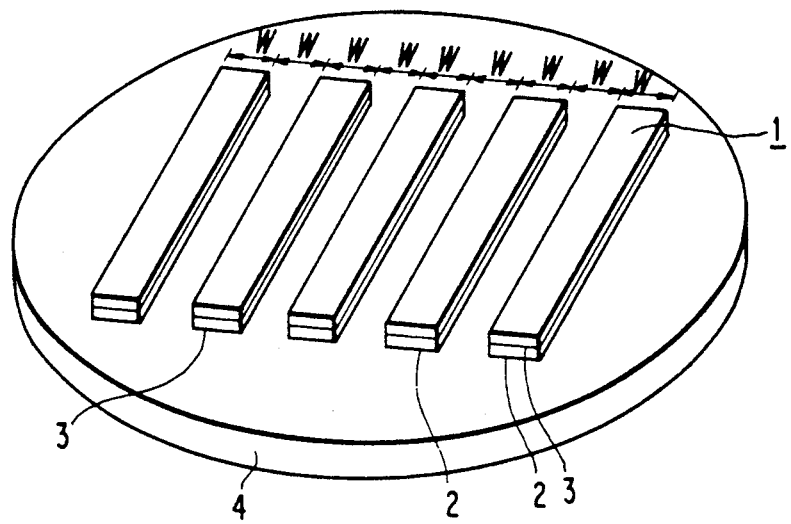

FIG. 3 shows the shape of test pieces of a two-layer film.

DESCRIPTION OF PREFERRED EMBODIMENTS

The thin film magnetic head according to the present invention will be explained in more detail hereinbelow with reference to the drawings.

Many researches have been made concerning change brought about in the reproducing (or playback) output by the magnetic domain structure of the magnetic head, see for example a report on a perpendicular magnetic head by Yamakawa et al entitled "Single Magnetic Pole Type Narrow Track Perpendicular Magnetic Head", in Technical Research Report, Society of Electronics Communication, on Magnetic Recording, MR84-28, (1984) 7. It is stated in this report that a clear reflux magnetic domain is observed in the single magnetic pole type perpendicular magnetic head having a magnetic role thickness of 0.3 $\mu$m, while a maximum sensitivity may be obtained for a ratio 2 h/w in the range from 0.3 to 0.4, where 2 h stands for the length along the direction of the track width of the reflux magnetic domains formed at each track end and W stands for the track width, and that the above relation is not dependent on the constants of the material, such as uniaxial magnetic anisotropy constant Ku or exchange stiffness constant A.

However, these conditions have been found out on the thin film in which clear reflux magnetic domains may be observed, and yet more, for a lower frequency range of the order of 80 kHz.

In the signal recording and reproduction to and from a video floppy employed in an electronic still video camera, to which the present invention is intended to be applied, it is necessary for the magnetic poles of the magnetic head to be magnetized by signals up to the frequencies up to a little more than 10 MHz (i.e., a few MHz higher frequencies than 10 MHz). Moreover, if the thickness of the magnetic pole reaches for example, about 10 $\mu$m, the structure of the magnetic domain does not necessarily develop the clear reflux magnetic domain structure but rather the so-called Liftshitz type or the three-dimensional magnetic domain structure. In addition, because of the potential applicability for magnetic recording of higher density and higher quality (or future needs for such application), the prospect in the near future is towards using a higher and higher signal frequency. Thus it has become incumbent to find conditions concerning the configuration as well as the type of materials of magnetic poles for which the recording/reproducing efficiency of the thin film magnetic head may be improved further for a high frequency of 1 MHz or more.

The present inventor has directed attention to the relation between the uniaxial magnetic anisotropy constant Ku and the magnetic pole width and, as a result of repeated experiments, found out the optimum relation under which the specific magnetic permeability may become maximum. This finding is the subject-matter of our earlier Japanese Patent Application No. 62-279360 (1987) (now JP Patent Kokai No. 1-122010 (1989)).

In view of the foregoing, the following experiments were conducted to make a scrutiny into the above mentioned conditions. That is, a single-layer film having a film thickness of 12 $\mu$m, a double-layer film having a film thickness per layer of 6 $\mu$m and a four-layer film having a film thickness per layer of 3 $\mu$m, were prepared, using a $SiO_2$ film (0.02 $\mu$m thick) as an insulating film. From these films, a large number of striped patterns, each having a magnetic pole width of W $\mu$m and a pattern length of 30 mm, were prepared, so that the direction of the magnetic pole width coincides with the axis of easy magnetization. These striped patterns were scrutinized as to how their relative magnetic permeabilities $\mu_y'$ and the magnetic domain structures were changed under the varying frequency of 1 to 10 MHz with changes in their uniaxial magnetic anisotropy constants Ku and the number of layers. The value for the pole width W was set to 30 to 200 $\mu$m. FIG. 3 shows the shape of test pieces. A film of $Co_{88.4}Nb_{8.0}Zr_{3.6}$ (at %), obtained by sputtering, was used as the magnetic pole material. Each test piece was finished to its final contour by heat treatment for controlling the anisotropy followed by dry etching by ion beam. The film exhibited a saturated magnetic strain $\lambda_s$ of the order of $+3 \times 10^{-7}$. A crystallized glass PEG 3120C having approximately the same coefficient of thermal expansion as the film, available from HOYA Co. Ltd., was used as the substrate material to eliminate the influence which otherwise might be caused by magnetostrictive effect which depend upon the pattern configuration. The specific magnetic permeability $\mu_y'$ was found from changes in inductance caused when the patterns were placed in the coil turns. The effect produced by the demagnetizing field was corrected by calculation, and the magnetic domain structure was observed by the bitter pattern method.

Figure 1:
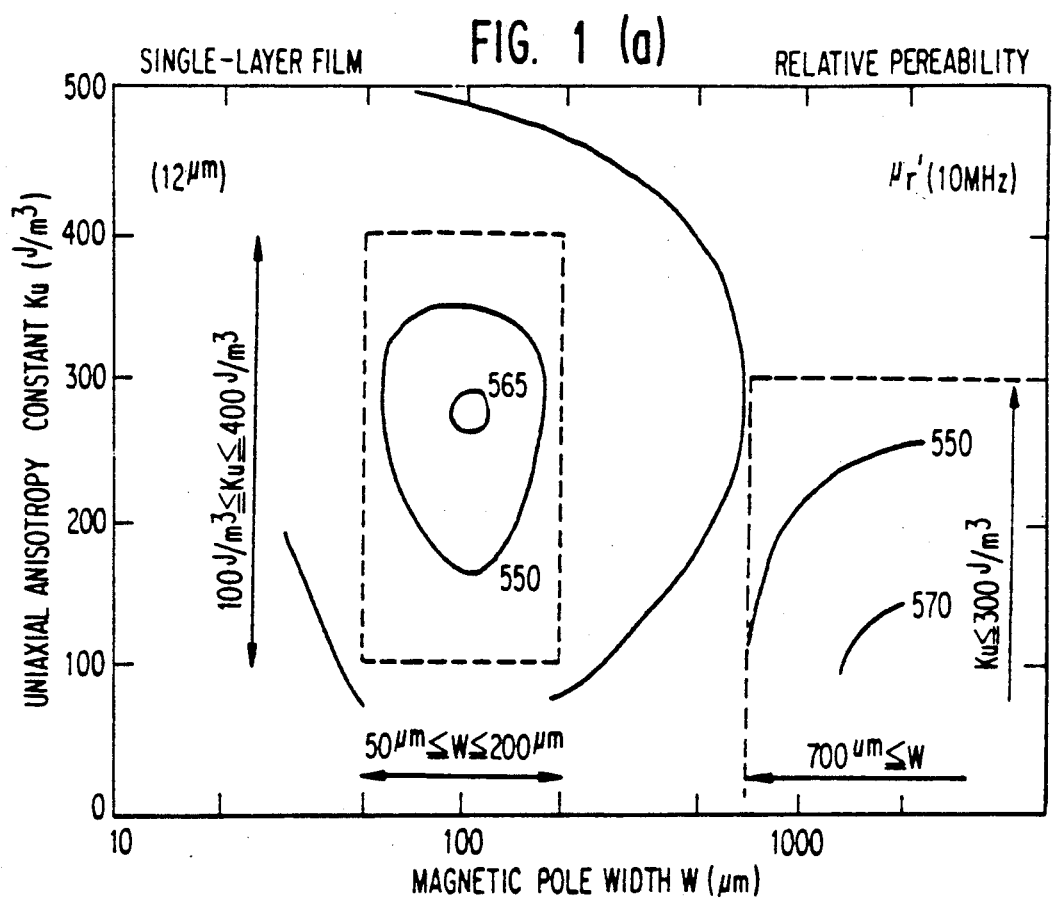
Figure 1:
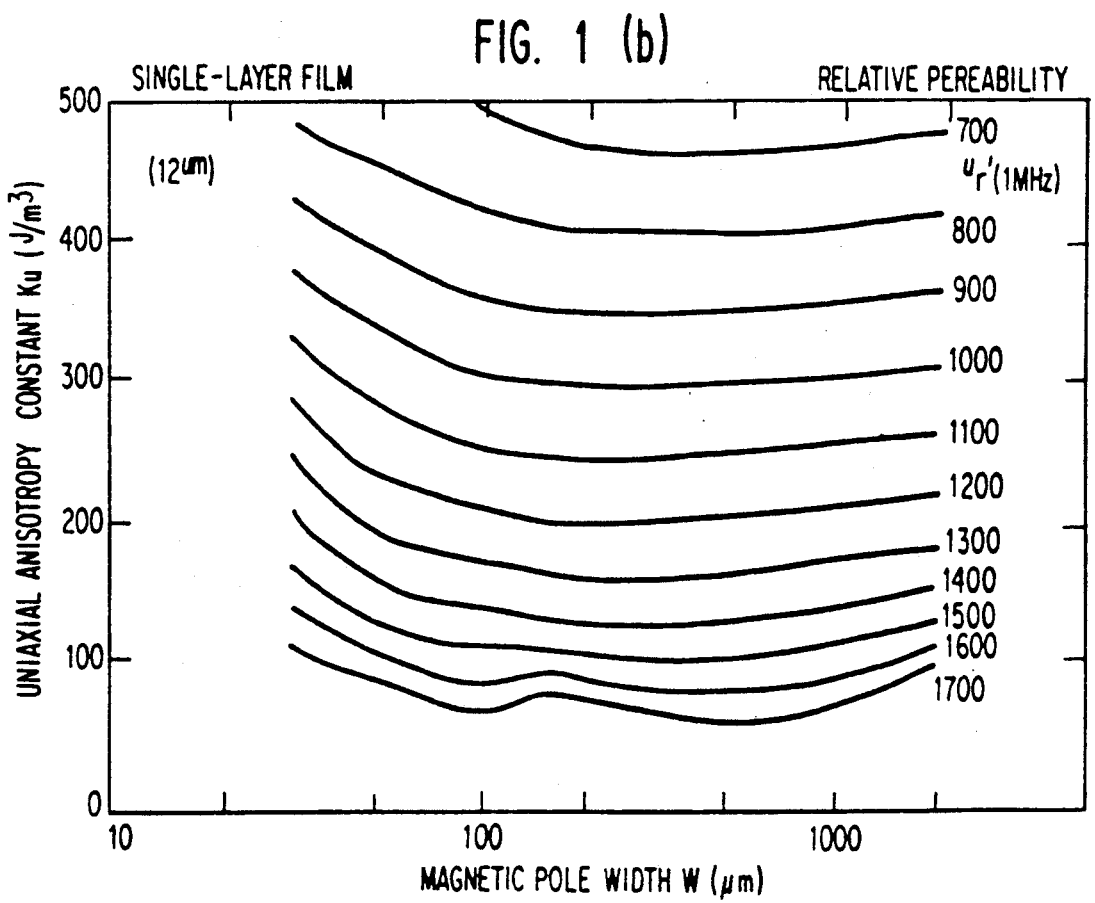
Figure 1:
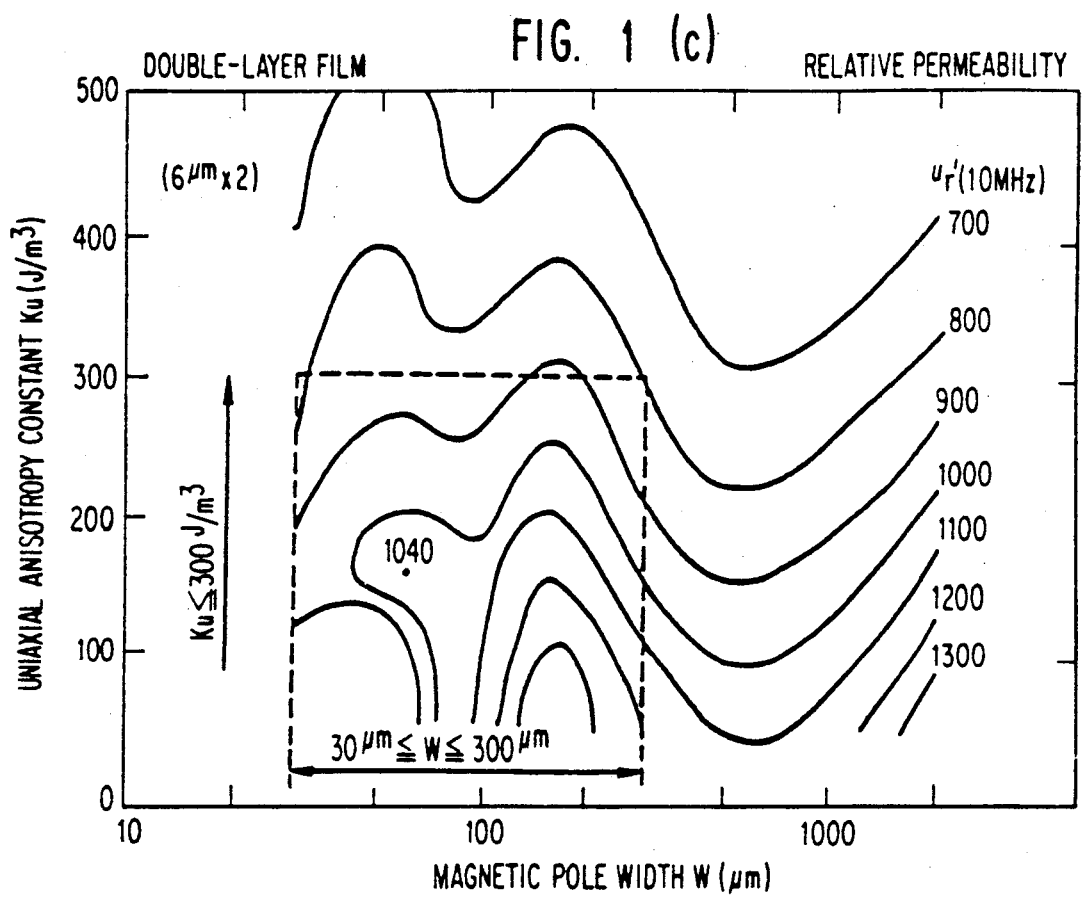
Figure 1:
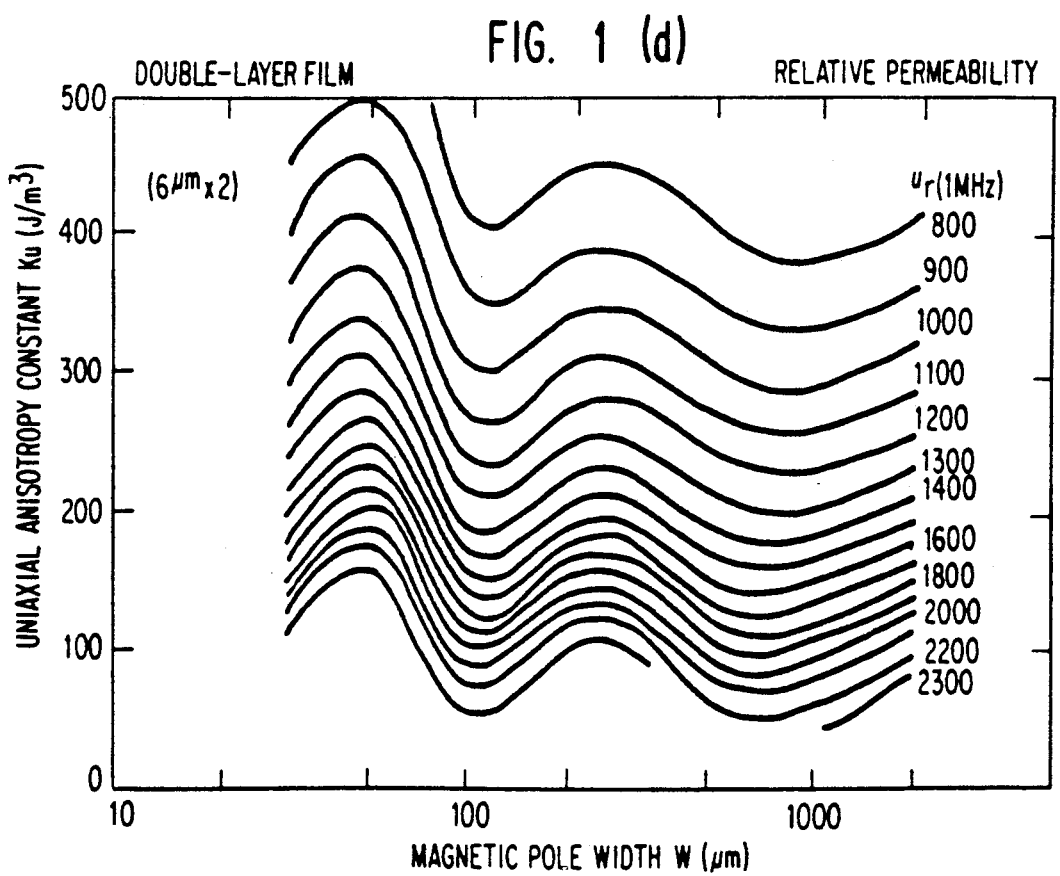
Figure 1:
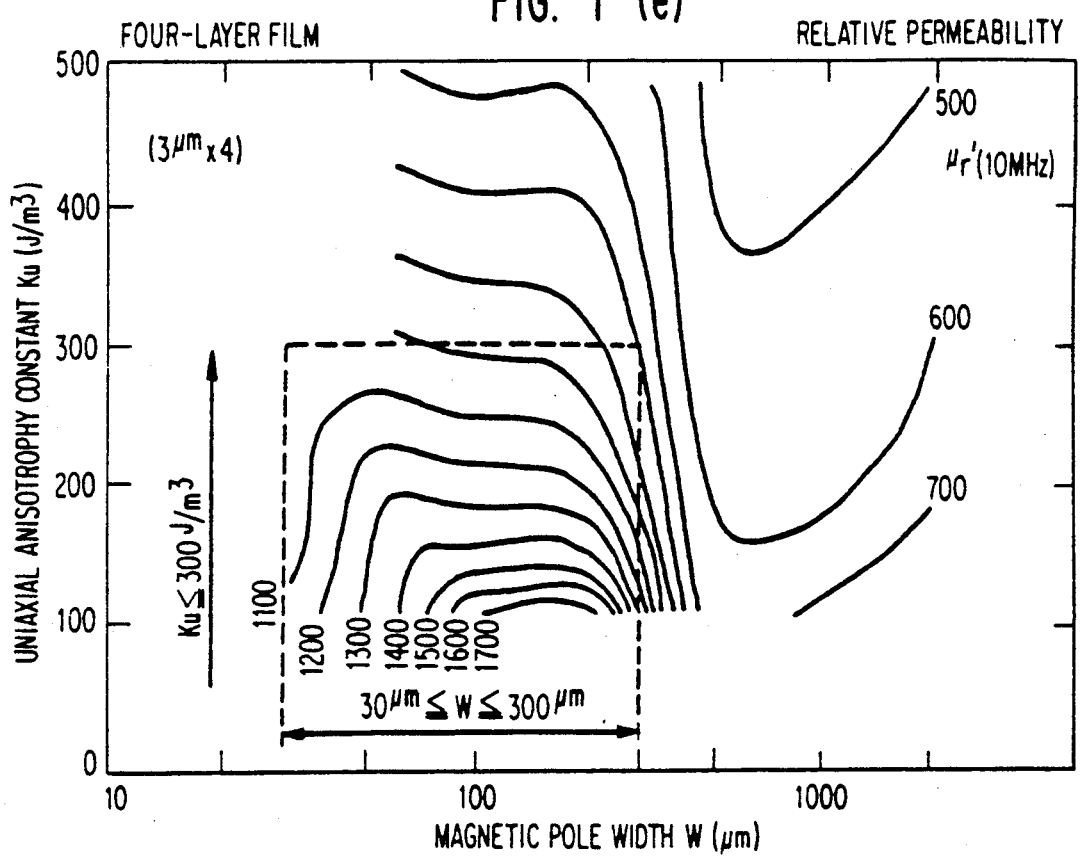
Figure 1:
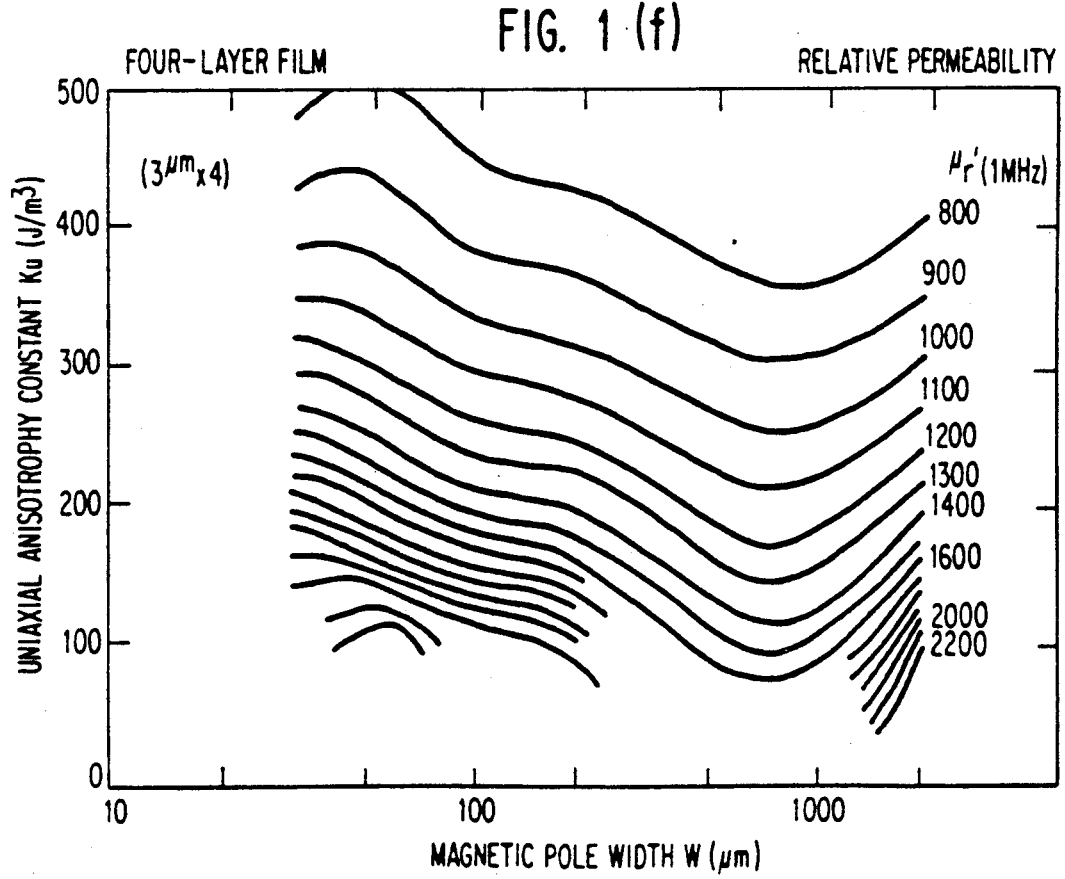

FIGS. 1(a), (c) and (e) for a frequency of 10 MHz and FIGS. 1(b), (d) and (f) for 1 MHz illustrate the relation of $\mu_y'$ with respect to Ku and W by a contour diagram drawn with respect to $\mu_y'$, for single-layer, double-layer and four-layer magnetic pole films, respectively. With the single-layer magnetic film, $\mu_y'$ yet has a lower value for the overall regions of W and Ku.

Conversely, with the two- and four-layer thin films, a marked increase in $\mu_y'$ is observed. Above all, for the ranges of W=30 to 300 $\mu$m and Ku$\leq$300 J/m$^3$, the value of $\mu_y'$ shows approximately values of 1,000 or more, indicating that the multi-layered film has a particular advantage with this range of Ku as compared with the single-layered film.

More specifically, with the double-layered film with W=90 to 300 $\mu$m and Ku$\leq$200 J/m$^3$, $\mu_y'$ of at least about 1,100, which is most desirable. With the four-layered film with W=30 to 300 $\mu$m and Ku$\leq$250 J/m$^3$, satisfying $\mu_y'$ of at least about 1,100, which is most desirable, while with W=50 to 200 and Ku$\leq$200 J/m$^3$, $\mu_y'$ of at least about 1,300 is achieved which is particularly desirable (FIG. 1(e)).

It may be contemplated that the magnitude of $\mu_y'$ is changed most markedly with different combinations of the configuration of the magnetic poles and the magnitude of magnetic anisotropy and with different structures of the magnetic domain obtained as a result of lamination.

Hence, by selecting the values of W and Ku for the thin film so as to satisfy the above relation, and laminating the layers into a thin film structure, the thin film magnetic head may be provided which will exhibit a satisfactory recording/reproducing efficiency over the broad frequency range. The values of W and Ku which will satisfy the above relation need not be constant for all portions of the magnetic circuit of a thin film magnetic head, but may differ from a given portion of the magnetic circuit of a thin layer magnetic head to another, so long as the values fall within the above defined ranges. For example, the effect of the present invention may be achieved with a thin layer magnetic head wherein the magnetic poles with W=50 μm and those with W=100 μm are combined together.

Besides $SiO_2$ which is most popular, the material for the nonmagnetic layer may be formed of oxide of metal such as SiO, $Al_2O_3$ or $ZrO_2$, or nitride etc.

A preferred example of a thin layer magnetic head prepared in accordance with the present invention is given hereinbelow.

EXAMPLE

FIG. 2 shows an exemplary magnetic pole configuration for a thin film magnetic head according to the present invention. The magnetic pole material employed is an amorphous soft magnetic alloy of $Co_{88.4}Nb_{8.0}Zr_{3.6}$ (atomic %). $SiO_2$ intermediate layers 2* each with a thickness of 0.02 μm and magnetic layers 1* each with a thickness of 3 μm are stacked alternately to give a total effective magnetic pole thickness of 12 μm. The magnetic anisotropy is afforded along the direction of the magnetic pole width W and is of a magnitude of Ku=100 $J/m^3$. The magnetic pole width of the magnetic head W=100 μm, the magnetic head width W'=60 μm and the gap distance t=0.23 μm, are adopted. This is suitable for image recording (analogue) for a still video recorder.

The magnetic material may also be Co-base amorphous soft magnetic film or permalloy or the like, as mentioned hereinabove, the material for the gap layer or the insulating film may also be $Al_2O_3$, besides $SiO_2$.

It should the noted that modifications may be made without deparing from the concept and gist of the present invention within the scope defined by the appended claims.

What is claimed is:

1. A thin film magnetic head adapted for recording and/or reproducing signals at a high frequency of 1 MHz or higher, in which a soft magnetic metal film having uniaxial magnetic anisotropy is used as a magnetic pole film material and the direction of the magnetic path of the magnetic circuit of the head is arranged to be substantially orthogonal to the axis of easy magnetization, wherein the improvement comprises:

the magnetic pole film material constituting the magnetic path being formed as a lamination of two or more soft magnetic metal films, with an intervening nonmagnetic film between the adjacent soft magnetic metal films, the length W of the magnetic pole film material along the direction of the axis of easy magnetization being such that 30 μm ≦ W ≦ 300 μm, and the uniaxial magnetic anisotropy constant Ku being such that Ku ≦ 300 $J/m^3$.

2. The thin film magnetic head as defined in claim 1, in which said intervening nonmagnetic film is 0.002 to 0.1 μm thick.

3. The thin film magnetic head as defined in claim 1, in which said intervening nonmagnetic film is 0.002 to 0.05 μm thick.

4. The thin film magnetic head as defined in claim 1, in which said soft magnetic films are of two-layered lamination.

5. The thin film magnetic head as defined in claim 4, in which W is 90 to 300 μm and Ku is not more than 200 $J/m^3$.

6. The thin film magnetic head as defined in claim 5, in which the soft magnetic layers have a relative magnetic permeability of at least 1100.

7. The thin film magnetic head as defined in claim 1, in which said soft magnetic films are of four-layered lamination.

8. The thin film magnetic head as defined in claim 7, in which Ku is not more than 250 $J/m^3$.

9. The thin film magnetic head as defined in claim 8, in which the soft magnetic layers have a relative magnetic permeability of at least 1100.

10. The thin film magnetic head as defined in claim 7, in which W is 50 to 200 μm and Ku is not more than 200 $J/m^3$.

11. The thin film magnetic head as defined in claim 10, in which the soft magnetic layers have a relative magnetic permeability of at least 1300.

12. The thin film magnetic head as defined in claim 1, in which the soft magnetic layers have a relative magnetic permeability of at least 1000.

13. The thin film magnetic head as defined in claim 1, in which said soft magnetic layers have a total thickness of not more than 12 μm.

14. The thin film magnetic head as defined in claim 13, in which each of the soft magnetic layers has a thickness of not more than 6 μm.

15. The thin film magnetic head as defined in claim 14, in which each of the soft magnetic layers has a thickness of not more than 3 μm.

16. The thin film magnetic head as defined in claim 15, in which the soft magnetic layers are of four-layer lamination.

17. The thin film magnetic head as defined in claim 1, in which said soft magnetic metal layers are an amorphous Co-base alloy or permalloy.

18. The thin film magnetic head as defined in claim 1, in which said intervening nonmagnetic film is oxide of metal.

* * * * *